Patented Jan. 10, 1933

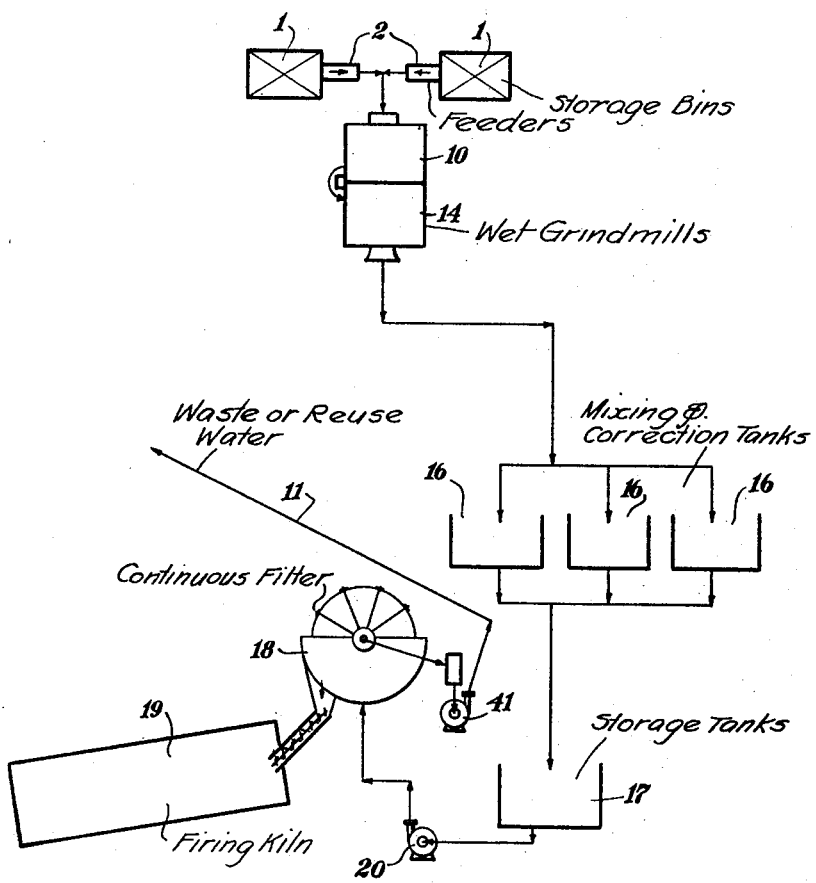

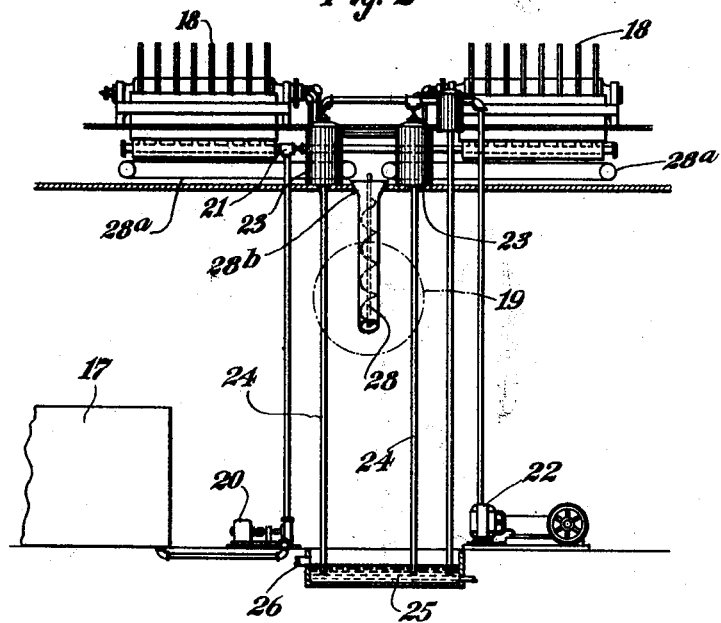
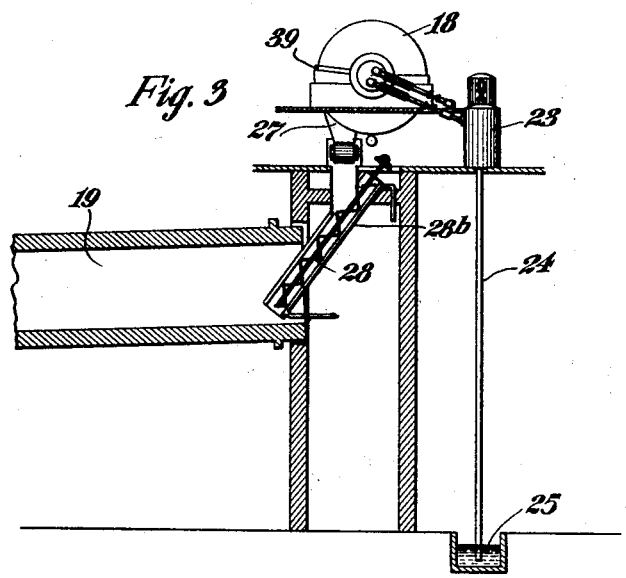

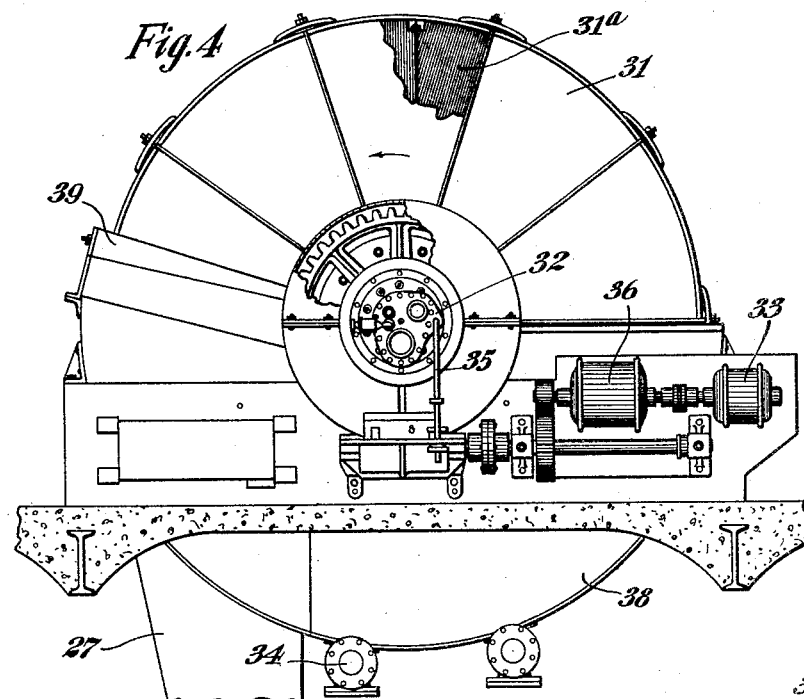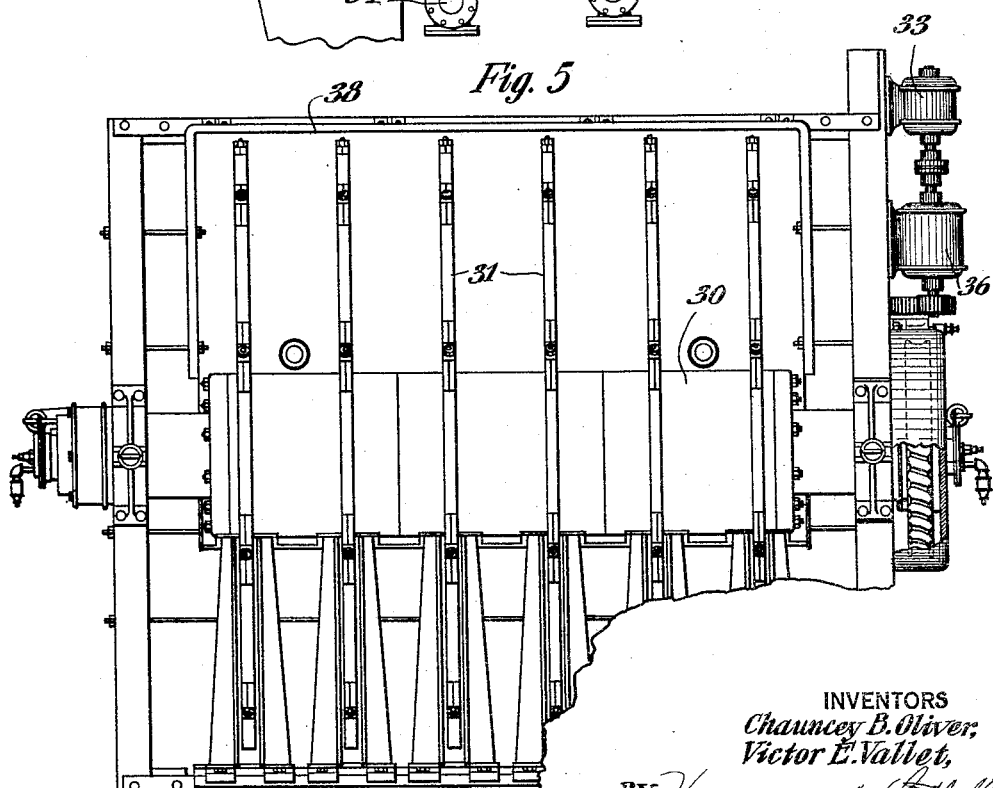

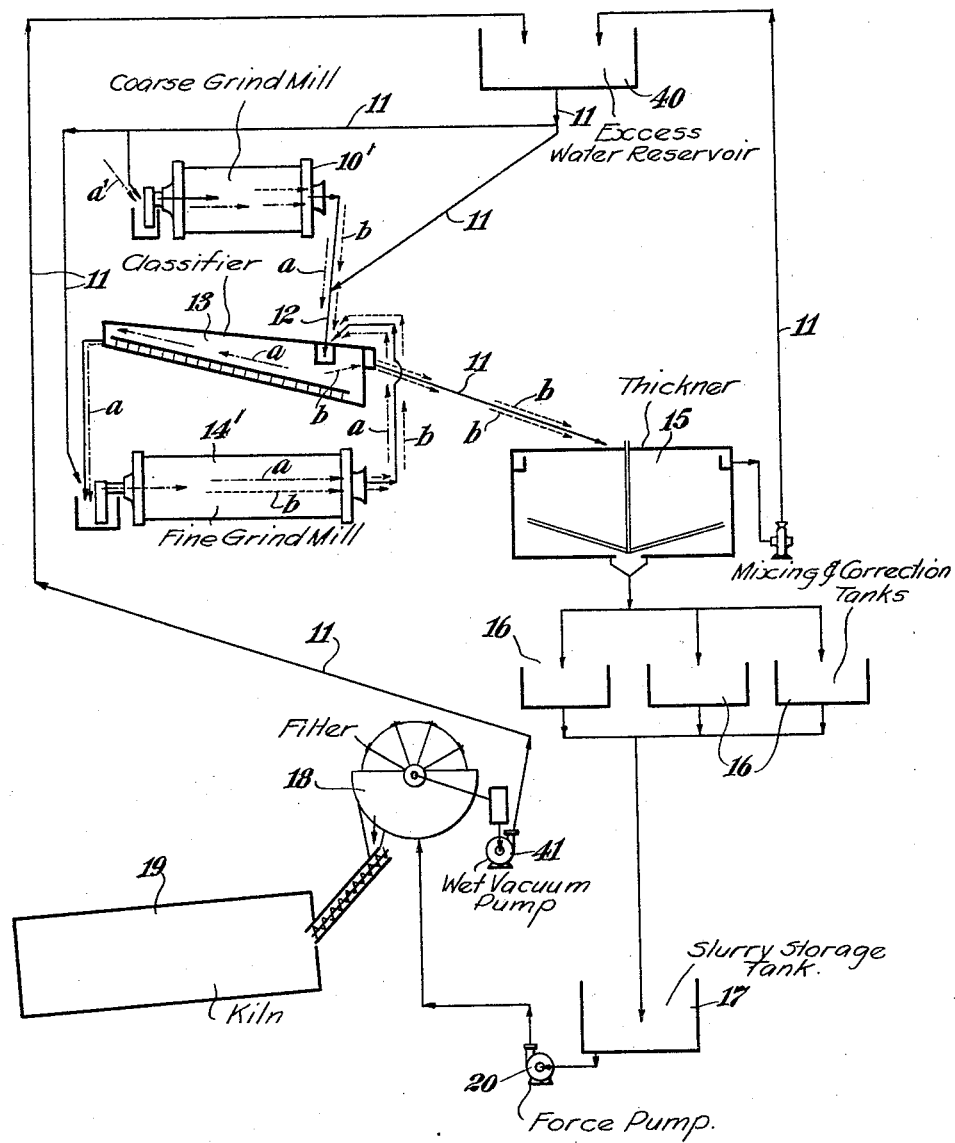

1,893,522

UNITED STATES PATENT OFFICE

CHAUNCEY B. OLIVER, OF OAK PARK, ILLINOIS, AND VICTOR E. VALLET, OF DETROIT, MICHIGAN, ASSIGNORS, BY MESNE ASSIGNMENTS, TO OLIVER UNITED FILTERS INC., OF SAN FRANCISCO, CALIFORNIA, A CORPORATION OF NEVADA

APPARATUS AND PROCESS FOR MAKING CEMENT

Application filed August 27, 1927. Serial No. 215,794.

This invention relates to a part of a process employed in the incorporation and amalgamation of cement making materials by wet grinding or the like and particularly to the separation therefrom of the excess water employed in securing such mixture or amalgamation previous to the burning of the mixture in kilns or furnaces for the production of hydraulic cements.

The principal object of this invention is to provide a more efficient method and means for removing water from slurries used in the so called "wet process" of manufacture of hydraulic cements than has heretofore been practised and to provide means for suitably feeding this solid slurry, containing less moisture than is possible by any methods heretofore practised, into the furnace or kiln for burning.

A further object of this invention is to provide a means whereby a continuous filter may be used between the slurry reservoir and the firing kilns to remove the excess water and conserve the heat necessary to fuse the material, thereby permitting continuous regulated flow of the materials through the grinding, dehydrating and burning steps without the annoying and expensive stoppages of one portion of the process while others "catch up", now so frequently experienced and for the purpose of saving fuel therein.

Another object of the invention is to provide a continuous method of reducing the moisture content of ground cement slurry whereby the addition of water to separate the fine and coarse materials in the classifier to permit economical closed circuit grinding, is rendered commercially practicable.

Another object of the invention is to provide a conveniently regulatable means interposed before the firing kilns that will so reduce the moisture content of the cement slurry as desired to allow reduction in the size of the firing kilns and to increase the capacity thereof.

Another object of the invention is to utilize a continuous filter to act as an easily regulated feeder of solid cake slurry to the kiln thus providing better operating conditions in the kiln and thereby a more uniformly burned clinker and a better quality of final cement resulting therefrom.

Another object of the invention is to provide a solid cake slurry for burning in the kiln thus materially changing the physical characteristics of the slurry during the drying, heating and fusing thereof in the kiln and thus providing a more continuous and more uniform operation of the kiln and a more uniformly burnt clinker.

An advantage of the invention is that the ground material may be kept in storage in an excess of water without danger of the cement ingredients setting up in the storage tanks, and the stored material may be quickly dewatered by the filter just prior to the burning of the cement.

Further objects and advantages of the invention will appear in the following description of the annexed drawings which exemplify one form of embodiment of the invention and, in which, Figure 1 is a diagrammatic sketch or flow sheet of one scheme or layout of a cement plant showing the location of the various important elements therein and the use of our invention.

Figure 2 is an elevation of a portion of a wet process cement plant showing the arrangement of apparatus in a preferred form.

Figure 3 is a detail end elevation showing one form of filter cake discharge and a cross section of the firing kiln for burning the slurry.

Figure 4 is an end view of a suitable continuous filter adapted to dewater slurry.

Figure 5 is a top plan view, partially cut away, of the filter shown in Figure 4, and Figure 6 shows a diagrammatic sketch or flow sheet similar to Figure 1 of a modified arrangement of the location of the elements for the so-called closed circuit grinding method for producing hydraulic cement.

It is well known in making the hydraulic cements now in common use, whether they be of blast furnace slag and suitable ingredients or from the usual ingredients used in the manufacture of the Portland variety, the grinding of the materials is facilitated by the so-called wet process which conserves the materials, grinds the mix more uniformly and, therefore, is more economical. However, before the cement clinker may be formed in the kiln, the water must be substantially removed because if it is driven off in a steam, an inordinately large amount of fuel is required, a much larger kiln is necessary for the same capacity, the regulation of the rate and quality of the resulting cement is handicapped by difficult control, and without substantial removal of the water, mud rings tend to form in the kiln hindering uniformity in quality and discharge. Not only does the elimination of moisture result in a solid form slurry entering the kiln, and obviate the above mentioned disadvantages, but it also changes the physical characteristics of this slurry and makes for a more uniformly combined and clinkered finished product. All of the operating obstacles hereinbefore mentioned are overcome and the excess water effectively removed in the following process which we have found to be highly desirable and efficient.

A description of a typical flow sheet showing an application of our aparatus in a typical wet process cement mill will readily be apparent to those skilled in the art of cement manufacture. Referring to Fig. 1 the storage bins 1 contain material for the manufacture of cement such as limestone, clay, marl, blast furnace slags or other preferred combinations. From these bins by means of suitable feeders 2, proper proportions are fed into the wet grinding mills 10 and 14. The coarse grinding part of the mill is represented at 10 while the fine grind part is 14, although separate coarse and fine grinding portions are not necessary to the practice of our invention. Suitable amounts of water are added with the materials from the feeders 2 prior to entering the grinding mill. The ground slurry then passes into the mixing and correction tanks 16 and into a final correction and storage tank 17 from which it is pumped by means of a suitable pump 20 or sent by gravity to a continuous filter 18. The mixing tank 16 is for the purpose of correcting the proportion of aluminum, silica and lime, as well as other chemical constituents of the cement slurry. The storage tank 17 merely stores the slurry and acts as a reservoir. It is also possible to make some corrections for the chemical constituents which may be changed from time to time. A settling tank or thickener may be interposed before the filter 18 if desired. Suitable overflow is provided from the filter 18 back to the final correction tank 17, if and when desired. In the continuous filter 18 water is removed from the slurry by means of a suitable vacuum auxiliary 41 as hereinafter described and discharged either for re-use or to waste. The slurry is discharged from the filter 18 in solid form into a suitable feeder 28 and then into the kiln 19. The continuous filter 18, therefore, acts as a dewaterer and as a feeder. It would be possible to use a pressure type of filter for the filter but in that event suitable storage for intermittent operation would have to be provided unless a continuous pressure filter were utilized. While we have shown one type of continuous filter it is our intention to specify any and all filters that will be suitable for this purpose, whether of the drum or disc type.

The side and end elevation of parts of the cement plant illustrated in Figs. 2 and 3 show one form of filter installation in which the fine slurry in the reservoir or final correction tank 17 is pumped through the pump 20 to the intake pipes 21 of the continuous filters 18. If the preferred form of suction filter of the disc type is used, the dry vacuum pumps 22 will be used, to maintain an efficient vacuum and the filtrate receivers 23 will have barometeric legs 24 each of a minimum length of 35 feet extending below to the water seal sump 25 from which incoming filtrate overflows and passes out by means of the overflow pipe 26 to be wasted or piped back to the reservoir 40 as desired.

Instead of barometric legs, suitable pumps can be installed at the bottom of the receivers for draining them of filtrate and if wet vacuum pumps are desired, they can be used in place of the receivers and dry vacuum pumps. It is not our intention to specify any particular equipment but simply to illustrate a suitable form of equipment as the auxiliaries for a continuous filter are well known.

From the filters 18 the slurry cake is discharged through the discharge chutes 27 onto the belt conveyors 28a by which it is conveyed to the chute 28b and fed by the screw conveyor 28 which is preferably water jacketed to the kiln 19 which may be of any preferred or desired form and in which the cement is finally burned or fused. The inlet and outlet pipes for the water connections to the conveyor jacket are shown in Figure 3. It is also possible to feed the solid slurry coming from the filter directly into a hopper suitably arranged to discharge the slurry into a chute or conveyor 28 and it is possible in some materials to eliminate the screw feeder. Air also may be used instead of the screw by introducing jets in suitable positions in the chute.

Figures 4 and 5 show cut away end and plan views respectively of one form of continuous filter suited for the process of dewatering slurry. The form shown is a disc type continuous suction filter and although a detailed description of the filter is not deemed necessary as the internal construction of the filter is not a part of this invention, to make a clear description of the operation of the filter in this process, the principal parts have been designated as follows. The rotatable hollow shaft 30 to which the filter discs 31 are suitably fastened is driven by a suitable variable speed motor 33 through the reduction gearing 36 controlling the rotating speed of the filter leaves through the sludge or cement slurry in the filter tanks 38.

The cement slurry, still in a highly fluid condition, is pumped by the pump 20 into the port 34 in the filter tank shown in Figure 4 thus filling the filter pan and maintaining the level during operation. By means of the suction created by the vacuum pump 22 in the filtrate receivers 23, the filtrate or water is drawn through the filter medium 31a covering the leaves 31 into the interior of the discs which are divided into sectors and by suitable connections to the respective passages in the interior of the hollow shaft 30, from which it is discharged through the filtrate control valve 32 with which the filtrate receivers are directly connected.

The solids not being allowed to pass through the filter medium 31a, accumulate on the discs 31 by the passage of the filtrate therethrough, and are carried up out of the tank 38 by the rotation of the leaves in the direction of the arrow shown in Figure 4. As the solids pass out of the tank, the vacuum remains on and dries the slurry into a cake and just prior to the reentry of the discs 31 into the tank 38, the scrapers 39 remove the accumulated cake which drops into the chute 27 by gravity as shown in Figure 2. The belt conveyor 28a moving under the respective chutes 27 then carries the filter cake of the mixed cement materials to the conveyor and thus to the kiln.

The rate, moisture content, and amount of cement cake discharged from the filters and thereby the amount of feed to the furnaces 19 may be controlled. This control is particularly exercised and governed by the following methods:

1. The degree of vacuum may be regulated by a suitable valve located at the convenience of the operator which will slow up the feed of the slurry from the reservoir 17, because it tends to regulate the amount of slurry collected on the filter medium.

2. The main filtrate valve 32 may be adjusted so that the amount of pick-up is varied, either automatically or otherwise thus regulating the active filtering period as is well understood in the art.

3. Variable speed motors 33 or change speed gears 36 may be used thus changing the rotative speed of the filter discs.

4. The amount of submergence of the filter leaves in the cement slurry in the tanks 38 will also control the rate of feed and percentage of moisture in the discharged cake.

5. The percentage of moisture in the slurry fed to the filter is also another method of controlling the capacity of the filter cake by very slightly altering the moisture in the discharged cake.

The water used in the process after being discharged may be either reused as substantially clear water or may be wasted as the percentage of slurry therein is negligible.

The application of this invention is even more advantageous when applied to a wet cement process that includes closed circuit grinding, well known in the art as the most efficient form of wet grinding as utilized in prevalent metallurgical milling practice, but to date little practised in the cement manufacturing industry. Prior to this invention, it has been impractical to use closed circuit wet grinding in the manufacturing of cement because of the impracticability of reducing the excess water in the slurry, necessary in closed circuit grinding to separate the fine particles from the coarser particles, to a point the same or less than the moisture possible in grinding without the use of closed circuit grinding. The excess water necessary in the use of closed circuit grinding can be eliminated by use of this invention and the slurry resulting from a closed circuit grinding fed to the kilns with less moisture than is now practised.

The raw cement forming materials are indicated by the arrow $a'$ in Figure 6 as entering the coarse grinding ball mill 10'. Here this material is mixed with a suitable amount of water from the pipe or conduit 11 to give efficient grinding and to break it up to a practical size depending upon the character and size of the orginal materials. Mostly coarse particles as shown by the arrows $b$ are formed although certain fines will be produced as shown by the arrows $a$.

The slurry from the mill 10' comprising the fines shown by the arrows $a$ together with the coarse, as shown by the arrows $b$, is suitably mixed with more water from the conduit 11 to permit proper classification and is passed through the conduit 12 into the classifier 13 and in which the amount of water is frequently from four to six times the weight of dry solids.

The classifier 13 is usually of the drag type hindered settling type or screening type and selectively distributes the coarse materials to the fine wet grinding mill 14' from which the slurry is again discharged into the classifier, the coarse materials being redirected through the fine grinding mill until reduced to the proper size and the fine material being distributed by the classifier to the thickener tanks 15. It is to be understood that in each grinding mill ample water is added from the water supply conduit 11, the amount being controlled by suitable valves at the control of the operator, enough being added to permit effective grinding of the materials. The classifier effectively separates the coarse and fine particles, discharging the fine and with the fine grind mill, causing the coarse to become finely ground. This circuit is known as closed circuit and uniformly grades the slurry.

The material reaching the thickener 15 is in a highly fluid state with the bulk of the water used in the preceding steps. After settling, and with the addition of the flue dust removed from the stack by a suitable washer, the slurry that passes to the mixing tanks 16 is composed of from 35% to 60% solids, the excessive water or clear effluent having been removed and pumped back to the water reservoir 40.

From the mixing tanks 16, the slurry passes into the correction and final reservoir tanks 17 from which it is pumped to a continuous filter or series of filters 18 as shown and described in Figures 1 and 2.

It is understood that Fig. 6 indicates a method of closed circuit grinding to which the filters can be applied and as closed circuit grinding is a well known art in metallurgical practice, the advantages of my invention will be evident to those learned in that art. Compartment mills can be used in place of two separate mills with a type of classification similar to that indicated.

The application of this process is also of particular value to wet cement plants making their slurry from blast furnace slag, wherein the slurry has a decided tendency to absorb moisture as it is stored in the tank, and has, therefore, a great tendency to set and cause difficulty in the process. By adding excessive amounts of water, which heretofore was impractical but which can now be entirely removed as herein described, the undue setting of the materials is prevented. The filter is not only designed to remove the excess water before the slurry passes into the kiln but the excess water removed is conveyed back to the intermediate steps of the process and thereby saves considerable water and also recovers any cement particles which may be carried thereby. The filter makes for more economical production because of the saving in fuel and the mechanical removal of the water without using heat.

The filter is of a further advantage because the moisture in the discharged cake is not effected by the moisture in the slurry delivered to it. In other words, by the suitable regulation above mentioned, the percentage of moisture and rate of flow may be successfully and closely governed and, therefore, more desirable amounts of water may be used in earlier stages of grinding. As is well known in the art, the thickener used is subject to practical limits of efficiency and with the addition of the filter between the thickener and the kiln, better results are obtainable.

The filter described functions to quickly dewater the slurry which will set otherwise and cause considerable difficulty in flowing it to the kiln. The use of the closed circuit grinding is dependent for economical and commercial success upon the use of large quantities of water which must be removed just prior to the passage of the material into the kiln when it must be quickly dewatered. This method of dewatering is, therefore, obviously more desirable than the preceding methods of allowing the slurry to settle and decanting the supernatant liquid or by adding retarding agents.

The filter, by being designed for the maximum capacity of the kiln can be adjusted as previously mentioned and the proper desired output can be accurately controlled as to rate of flow and per cent of moisture by this filter device, and the uniform load, so desirable for practical reasons may be maintained on the kiln.

While we have shown one preferred form of embodiment, we know that various modifications and applications of our invention may occur to those skilled in the art, such as the recovery and burning of carbonate of lime to convert it into calcium oxide as in the Solvay process, and we do not, therefore, wish to be limited to the exact details of construction or use but to interpret the invention broadly within the spirit and scope of the description and the appended claims.

We claim:—

1. The process of making cement which comprises grinding the cement making materials in the presence of water, adding additional water, and separating the coarse and fine particles, regrinding the coarse particles and again separating and regrinding the coarse particles, settling the finely ground slurry and water to remove part of the moisture therein, continuously filtering the settled slurry to quickly reduce the moisture content and convert it into a solid filter cake and burning the solid filter cake.

2. The process of making cement which comprises wet grinding the cement making materials, regrinding the coarse particles with an excess of water in a closed circuit to produce a fine uniform slurry, settling the slurry to remove part of the excess water, continuously filtering the fine slurry to remove the remaining excess water, controlling the operation of the filter to regulate the moisture content and rate of filter cake discharge and regularly feeding the filtered cake to the burning kilns.

3. The method of producing cement in a wet process cement mill, which comprises grinding the cement forming materials with an excess of water, maintaining the cement making materials in an excess of water prior to dehydration thereof, settling the cement making materials to partially remove the water, continuously filtering the settled cement making materials to quickly remove the remaining water and form a solid filter cake, drying the filter cake on the filter, feeding the solid filter cake into the kiln and burning the filter cake to a suitable clinker.

4. The method of producing cement in a wet process cement mill, which comprises closed circuit grinding of the cement making materials in the presence of an excess of water, maintaining the materials in an excess of water, continuously filtering the materials to remove the excess of water and provide a solid filter cake, controlling the operation of the filter so as to provide a substantial uniform moisture content in the discharge filter cake regardless of variations in the moisture content of the materials fed to the filter, and burning the filter cake to a suitable clinker.

In testimony whereof we have affixed our signatures to this specification.

CHAUNCEY B. OLIVER.
VICTOR E. VALLET.